(12) United States Patent
Keller

(10) Patent No.: US 7,789,568 B2
(45) Date of Patent: Sep. 7, 2010

(54) MOUNTING PIECE FOR ADMITTING A ROLL PIN

(75) Inventor: Karl Keller, Hilchenbach (DE)

(73) Assignee: Hilti Aktiengesellschaft, Schaan (LI)

( * ) Notice: Subject to any disclaimer, the term of this patent is extended or adjusted under 35 U.S.C. 154(b) by 1204 days.

(21) Appl. No.: 10/543,249

(22) PCT Filed: Jan. 16, 2004

(86) PCT No.: PCT/EP2004/000279

§ 371 (c)(1),
(2), (4) Date: Mar. 22, 2006

(87) PCT Pub. No.: WO2004/065031

PCT Pub. Date: Aug. 5, 2004

(65) Prior Publication Data

US 2007/0003174 A1   Jan. 4, 2007

(30) Foreign Application Priority Data

Jan. 22, 2003   (DE) .............................. 103 02 271

(51) Int. Cl.
*F16C 13/02* (2006.01)
*F16C 33/10* (2006.01)

(52) U.S. Cl. ................... 384/398; 384/400; 384/403

(58) Field of Classification Search ................. 384/286, 384/322, 369, 397, 398, 400, 403
See application file for complete search history.

(56) References Cited

U.S. PATENT DOCUMENTS

| 1,900,593 | A | * | 3/1933 | Wade ........................ 384/398 |
| 3,433,542 | A | | 3/1969 | Tonooka et al. |
| 3,685,874 | A | * | 8/1972 | Gerard ....................... 384/114 |
| 3,734,580 | A | * | 5/1973 | Piscitelli ..................... 384/131 |
| 4,285,551 | A | | 8/1981 | Suzuki et al. |
| 4,749,283 | A | * | 6/1988 | Yokomatsu et al. ........... 384/12 |

FOREIGN PATENT DOCUMENTS

| EP | 0285333 | 10/1988 |
| GB | 0015611 | 2/1919 |

* cited by examiner

*Primary Examiner*—William C Joyce
(74) *Attorney, Agent, or Firm*—Abelman, Frayne & Schwab

(57) ABSTRACT

A mounting piece (1) for receiving a roll neck of a roll used in steel and non-ferrous metal processing has at least one lubricant-receiving chamber (7) on a roll body side (3) and at least one lubricant-receiving chamber (8) on a discharge side (4) which are located beneath a lowest support point (9), connection bores (10) between the lubricant-receiving chambers (7, 8) on the roll body and discharge sides (3, 4), wherein the lubricant (2) is collected in additional lubricant-receiving chambers (15, 16) in the mounting piece (1).

2 Claims, 2 Drawing Sheets

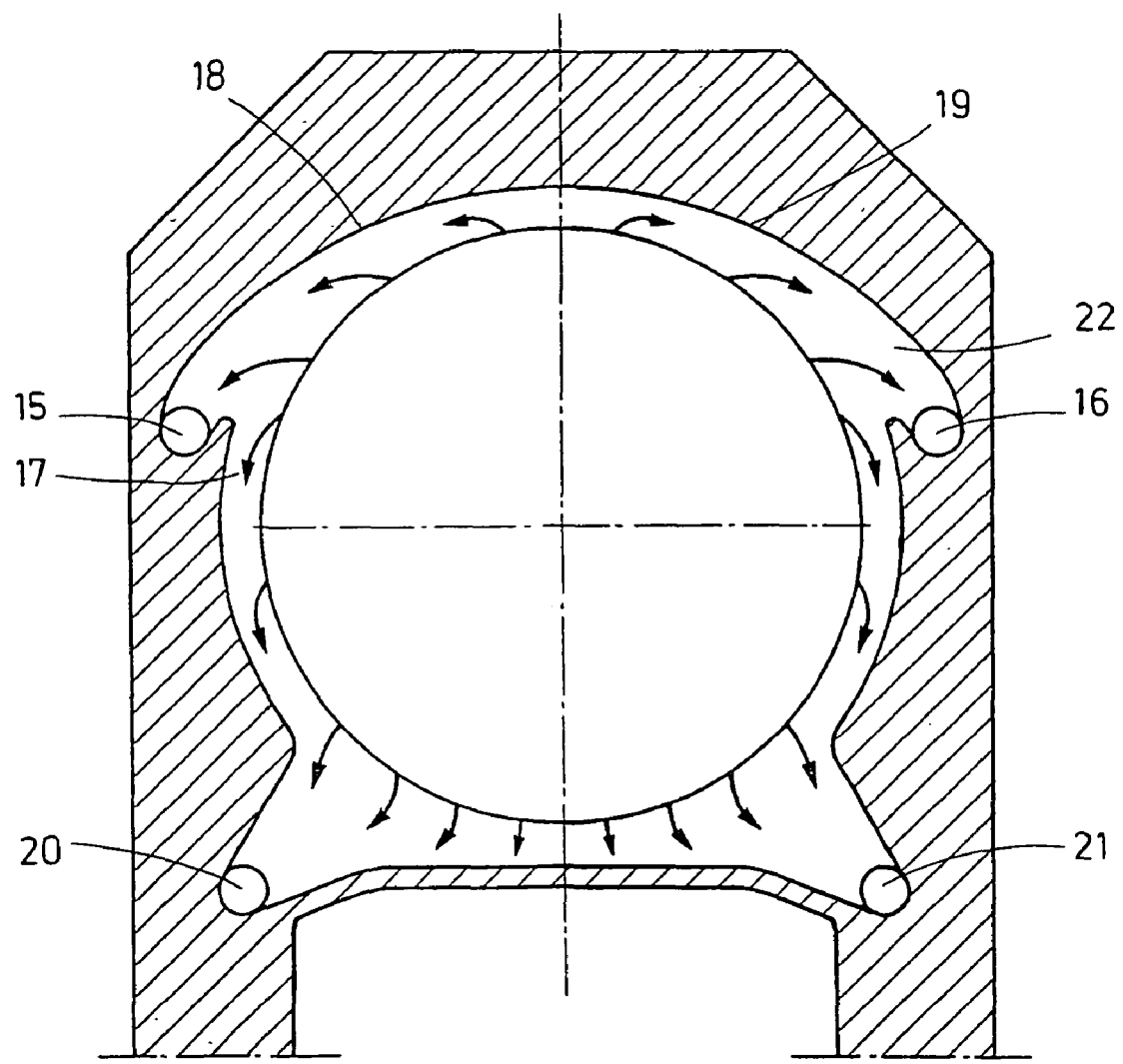

MOUNTING PIECE FOR ADMITTING A ROLL PIN

BACKGROUND OF THE INVENTION

1. Field of the Invention

The present invention relates to a mounting piece for receiving a roll neck of a roll used in steel and non-ferrous metal processing, having at least one lubricant-receiving chamber on a roll body side and at least one lubricant-receiving chamber on a discharge side which are located beneath a lowest support point, and connection bores between the lubricant-receiving chambers on the roll body and discharge sides.

2. Description of the Prior Art

Roll neck bearings, in particular morgoil roll neck bearings, are used in rolling mill construction for many years. Here, all of the load-carrying bearing parts, including fastening elements and sealings are accommodated in a bearing housing, a so-called mounting piece.

On the necks of rolls, the roll necks, there are provided neck linings. Together with the bearing bushes, the neck linings form radial bearings, with the bearing bushes being secured in the mounting pieces. The bearing bushes surround the neck linings.

Between the outer surface of the neck lining, and the inner surface of the bearing bush, there is provided an oil film that prevents a metal contact of the bearing sliding surfaces. The oil continuously flows through the bearing under pressure. This means that the oil flows in a loop. The oil enters the radial bearing through oil run-in surfaces. Those are located in the bearing bush and are supplied with oil from an oil reservoir through conduits which are formed in the mounting piece as bores.

Under a constant pressure of an oil pump, the oil reaches the bearing sliding surfaces and is distributed there. The excess oil exits at both side edges, is accumulated there and is return to the oil reservoir through the discharge conduits.

In order to prevent during rolling that oil from the bearing reaches the rolling stock, there is provided a sealing on the roll body side. Sealing of a bearing with an oil film can be effected with a compression molded rubber profile. The sealing insures that the oil, which leaves the bearing, reaches the hollow space of the mounting piece from which a further delivery is carried out.

In the known mounting pieces, the further delivery of oil, which accumulates on the roll body side in receiving chambers, is effected through two bores that connect the roll body side with the discharge side.

The bores are located beneath the lowest support point. The oil flow through the bores to an oil-collecting chamber on the discharge side of the mounting piece. Therefrom, oil flows through two bore connections, usually through movable tubings, in a return conduit and to the oil reservoir.

During operation of a rolling mill, the function of the roll body side sealing can be distorted, e.g., upon build-up of oil in the receiving chamber, the sealing lips of the roll body side sealing extend into an oil pan. A further distortion may consist in, e.g., in wear of the lips of a sealing. The change in the properties of the sealing lips can lead to flow of oil out. This results in oil leakage and large oil losses. In cold rolling trains, the oil leakage can cause, e.g., staining of a strip that adversely affects the quality of the product.

European Publication EP 0 285 333 B1 discloses a bearing bush that is divided by a annular channel in the bearing center in two bearings. Through this annular channel, about 50% of the discharged oil is discharged. The roll body side sealing system is loaded only with a half of a conventional amount of oil. The possibility of an uncontrolled oil exit is reduced. Here, it is important that both region of the bearing bush are provided with their own inlets through which oil is fed to the inner bearing surfaces. Further, the additional measures involve increased manufacturing costs.

The object of the invention is to provide a mounting piece of a type described above in which the contact of the sealing lip of the roll body side sealing with a lubricant is reduced, and the mounting piece can be economically produced.

SUMMARY OF THE INVENTION

The object of the invention is achieved, according to the invention, by collecting the lubricant in additional lubricant-receiving chambers in the mounting piece.

An embodiment is proposed in which there are available at least four lubricant-receiving chambers on the roll body side.

According to a further improvement of the construction, it is provided that the additional roll body side, lubricant-receiving channels are connected with the lubricant-receiving channels on the discharge side by separate bores.

As a further development, it is provided that the return lubricant streams are brought together on the discharge side. Therefrom, they delivered to a storage reservoir together, where the oil is purified and/or cooled. A further advantage is achieved by arrangement of the additional lubricant-receiving chambers above the central plain, at a height of the central plain, or beneath the central plane.

The lubricant, which reaches the receiving chambers, is delivered to the discharge side through bores. Thereby, it is achieved that the amount of the lubricant in the lower receiving chambers, which were already used before, is reduced. The height of the lubricant level in the lower region is reduced, and the sealing lips of the roll body side sealing system, e.g., are not extended anymore into a lubricant pan.

BRIEF DESCRIPTION OF THE DRAWINGS

The invention will now be described in detail on the basis of very schematic drawings. The drawings show:

FIG. 2 a front view of the mounting piece of FIG. 1 taken along line x-x.

DETAILED DESCRIPTION OF THE PREFERRED EMBODIMENT

Figure 1:
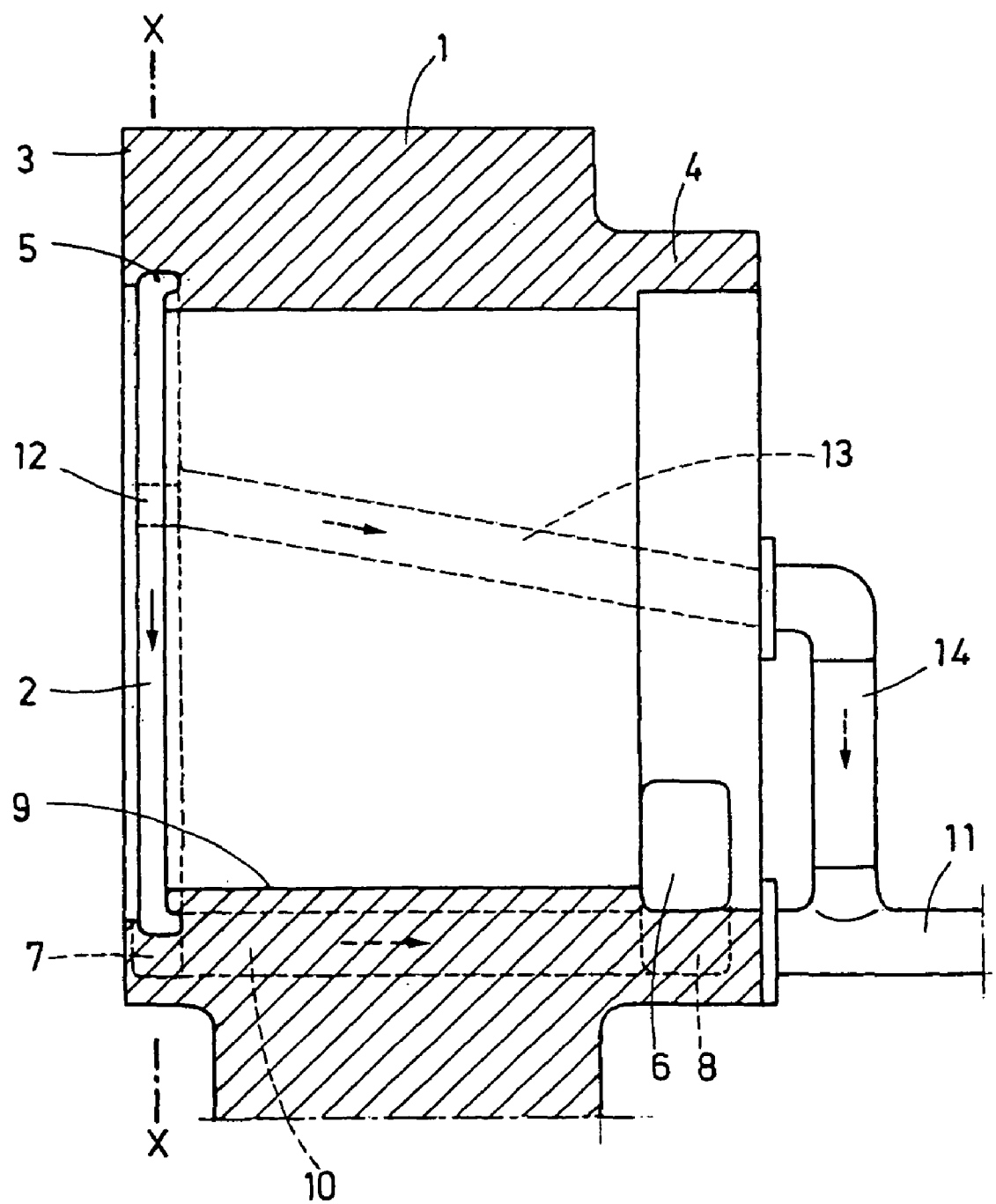
FIG. 1 a cross-sectional view of a half of a mounting piece.

A roll neck (not shown) is supported in a mounting piece 1, extending through a neck lining (not shown) and a bearing bush (not shown). The neck lining is fixedly connected with the roll neck, and the bearing bush is fixedly secured in the mounting piece 1. Between the bearing bush and the neck lining, a lubricant film is provided. Lubricant 2 reaches the gap between the bearing bush and the neck lining through a lubricant circulation system over run-in surfaces. With a symmetrical load distribution, half of the lubricant 2 would be distributed on a roll body side 3 and half on a discharge side 4. For discharging of the lubricant 2, there are provided in the mounting piece 1, on the roll body side 3 and the discharge side 4, circumferential lubricant collection channels 5, 6. In their lower regions, the lubricant collection channels 5, 6 expand, forming two lubricant-receiving chambers 7, 8 which are located beneath the lowest point 9 of the bearing bush.

The known bore 10, which is provided beneath the mounting piece 1, provides for flow of the lubricant 2 from the lubricant-receiving chamber 7 on the roll body side 3 to the discharge side 4 of the mounting piece 1. The lubricant 2 is collected on the discharge side 4 in the lubricant-receiving chamber 8 and is fed therefrom over a movable tubing 11 to a lubricant reservoir (not shown).

There, the lubricant 2 can be purified and/or cooled to be subsequently fed in the bearing again. For better delivery of the lubricant 2, there is provided, above the central plan, a lubricant-receiving chamber 12. The lubricant-receiving chamber 12 communicates with the discharge side 4 through a bore 13. On the discharge side 4, the lubricant 2 is fed in to the tubing 11 through a connection piece 14.

FIG. 2 shows an example of positioning of two additional lubricant-receiving chambers 15 and 16. Those are located above the central plane. Dependent on the rotational direction of the roll, the lubricant drops 17 are accelerated on outer surfaces 18 or 19 of a lubricant collection channel 22.

Therefrom the lubricant 2 can be delivered into the lubricant-receiving chamber 15 or 16. The lubricant 2, which is discharged beneath the lubricant-receiving chambers 15 and 16 flows into the lower lubricant-receiving channels 20, 21.

The shown embodiment of the mounting piece 1 with four lubricant-receiving chambers 15, 16, 20 and 21 and, thus, with four bores should be considered as an example. Dependent of a design of the mounting piece, further lubricant-receiving chambers and bores can be provided.

LIST OF REFERENCE NUMERALS

1. Mounting piece
2. Lubricant
3. Roll body side
4. Discharge side
5. Lubricant collection channel
6. Lubricant collection channel
7. Lower lubricant-receiving chamber
8. Lower lubricant-receiving chamber
9. The lowest point of the bearing bush
10. Bore
11. Tubing
12. Lubricant-receiving chamber
13. Bore
14. Connection piece
15. Upper lubricant-receiving chamber
16. Upper lubricant-receiving chamber
17. Lubricant drops
18. Outer surface
19. Outer surface
20. Lubricant-receiving chamber
21. Lubricant-receiving chamber
22. Lubricant-receiving channel

The invention claimed is:

1. A mounting piece for receiving a neck of a roll used in steel and non-ferrous metal processing, comprising at least one lubricant-receiving chamber located on a roll body side of the mounting piece; at least one lubricant-receiving chamber located on a discharge side of the mounting piece, both the lubricant-receiving chamber on the roll body side of the mounting piece and the lubricant-receiving chamber on the discharge side of the mounting piece being located entirely beneath a lowest support point of a bearing bush of the mounting piece; a connection bore for connecting the at least one lubricant-receiving chamber on the roll body side with the at least one lubricant-receiving chamber on the discharge side; and at least three additional lubricant-receiving chamber located on the roll body side of the mounting piece, wherein the at least three additional roll body side lubricant-receiving chambers are connected with the lubricant-receiving chambers on the discharge side, and wherein return lubricant streams are brought together on the discharge side (4) of the mounting piece.

2. A mounting piece for receiving a neck of a roll used in steel and non-ferrous metal processing, comprising at least one lubricant-receiving chamber located on a roll body side of the mounting piece; at least one lubricant-receiving chamber located on a discharge side of the mounting piece, both the lubricant-receiving chamber on the roll body side of the mounting piece and the lubricant-receiving chamber on the discharge side of the mounting piece being located entirely beneath a lowest support point of a bush of the mounting piece; a connection bore for connecting the at least one lubricant-receiving chamber on the roll body side with the at least one lubricant-receiving chamber on the discharge side; and at least three additional lubricant-receiving chamber located on the roll body side of the mounting piece, wherein at least two additional lubricant-receiving chambers are arranged above a central plane of the mounting piece.

* * * * *

UNITED STATES PATENT AND TRADEMARK OFFICE
CERTIFICATE OF CORRECTION

PATENT NO.        : 7,789,568 B2
APPLICATION NO.   : 10/543249
DATED             : September 7, 2010
INVENTOR(S)       : Karl Keller It is certified that error appears in the above-identified patent and that said Letters Patent is hereby corrected as shown below:

Title page, item (73) Assignee: Should Read

-- {73}  SMS Siemag AG, Duesseldorf (DE) --.

Signed and Sealed this

Seventh Day of December, 2010

David J. Kappos
*Director of the United States Patent and Trademark Office*